April 19, 1960 L. R. BATTERSBY ET AL 2,933,693

SENSITIVITY CONTROL CIRCUIT

Filed May 3, 1957

INVENTORS,
LYLE R. BATTERSBY
ROBERT A. JOHNSON.

BY

Harry M. Saragovitz

ATTORNEY.

2,933,693

SENSITIVITY CONTROL CIRCUIT

Lyle R. Battersby, Little Silver, and Robert A. Johnson, Long Branch, N.J., assignors to the United States of America as represented by the Secretary of the Army Application May 3, 1957, Serial No. 656,994

1 Claim. (Cl. 330—138)

(Granted under Title 35, U.S. Code (1952), sec. 266)

The invention described herein may be manufactured and used by or for the Government for governmental purposes, without the payment of any royalty thereon.

This invention relates to electronic circuits, and particularly to a means for controlling the bias voltage on the grid circuit of a vacuum tube. More particularly, this invention relates to a means for varying the impedance of the grid circuit of a vacuum tube with respect to the applied voltage.

One device for biasing the grid of a vacuum tube to accommodate excessive input signal voltages is the conventional coupling condenser and grid leak where the grid draws current, which negatively charges the grid coupling condenser. The charge then leaks off through the grid leak resistor when the excessive signal is terminated. This system requires a long time for the grid bias to return to its most sensitive operating potential since both the condenser and the resistor must have an appreciable value. If the condenser is decreased in size to permit a faster discharge, the incoming signals will be attenuated by the high series impedance of the condenser. If the resistor is decreased in size to permit a faster discharge, the incoming signals will again be attenuated by the low shunt impedance of the resistor.

If a radio frequency choke alone is provided as a grid leak the input impedance will be correct for alternating currents but will be almost a short circuit for direct currents. This would tend to draw off the biasing charge from the grid coupling condenser so quickly that it would appear as an appreciable drain on the local transmitting source.

Diodes and other devices would, similarly, have a relatively low resistance to direct currents at a high biasing voltages with a relatively high resistance when the bias voltages are reduced, which is diametrically opposite to the effect desired.

It is therefore an object of this invention to provide an improved circuit that will have a high impedance across the grid circuit when the bias voltage is relatively high and a low impedance when the bias voltage is low.

It is a further object of this invention to provide an improved grid leak system that will have an effective resistance directly proportional to the grid voltage.

It is a further object of this invention to provide a grid leak system that will quickly restore the grid voltage to its optimum operating level without appreciably loading the local signal source.

These and other objects are accomplished by the use of a transistor having its output connected through a radio frequency choke between the grid and cathode and its input biased positively to control the range of effective resistance of the transistor to the grid circuit.

This invention will be more particularly described and other and further objects of this invention will become apparent from the following specification and the drawings, wherein.

Figure 1:
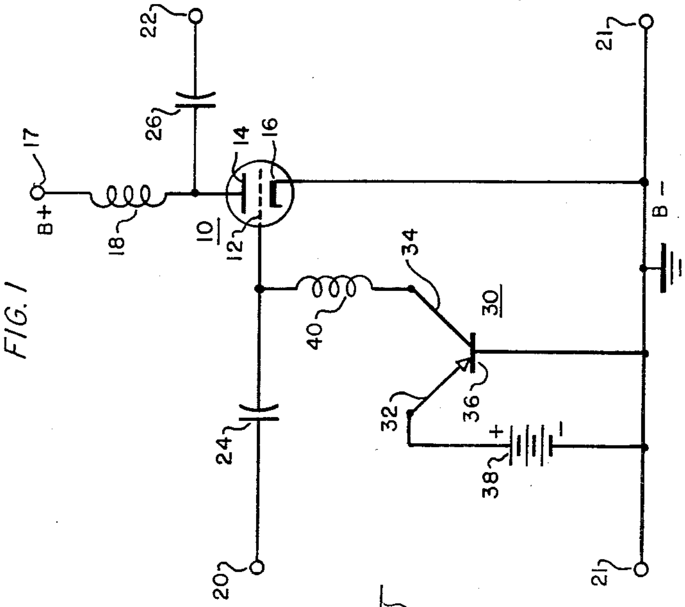
Fig. 1 shows a circuit diagram of this invention.

Referring now more particularly to Fig. 1 of the drawing, a vacuum tube 10 is shown having grid, plate, and cathode electrodes 12, 14, and 16, respectively. A source of potential 17 is applied through a load inductance 18 to the plate 14 of the vacuum tube 10. The input to this vacuum tube amplifier is across the terminals 20 and 21, and the output of the amplifier is across the terminals 22 and 21. The input signal is applied through condenser 24 to the grid and the output is taken from the plate 14 through condenser 26.

The transistor 30 has emitter, collector and base electrodes 32, 34, and 36, respectively. The base electrode of the transistor 30 is connected to ground along with the cathode 16 of the vacuum tube. The emitter of the transistor is biased positively relative to the base by a battery 38, and the collector 34 is connected through a radio frequency choke 40 to the grid electrode 12.

Figure 3:
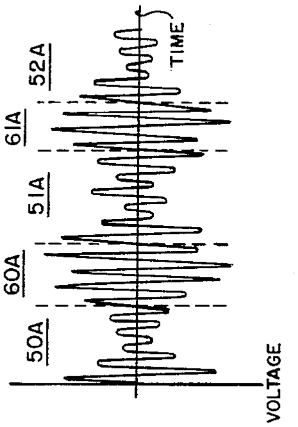
Figs. 2 and 3 show waveforms to be found in this circuit during operation.
Figure 2:
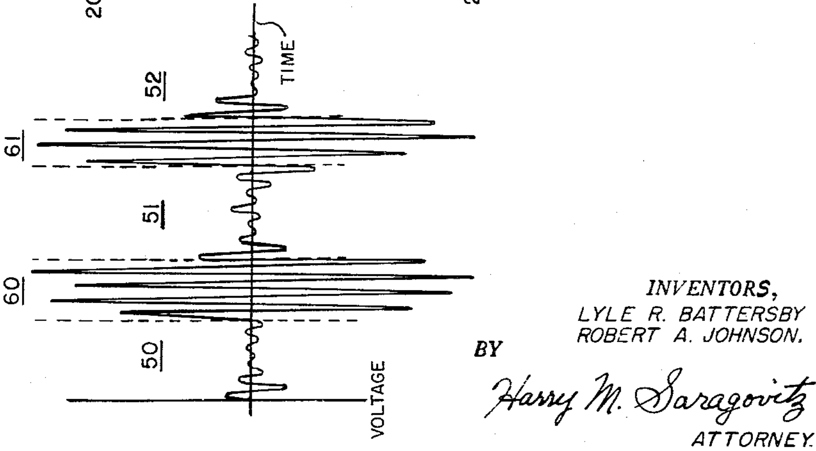

In operation, signal voltages may be applied across the input terminals 20 and 21, and may alternately include signals 50, 51, etc., received from a distant transmitter, and signals 60, 61, etc., picked up from a local transmitter associated with this receiver, as shown in Fig. 2. The signals 50 and 51 are to be amplified by the vacuum tube and will appear as the signals 50A and 51A of Fig. 3, increased in accordance with the gain of the tube 10 and any other stages of gain which may be added. The incoming signals 60 and 61, which are picked up from a local transmitter are very much greater than the vacuum tube 10 could amplify, but they bias the grid of the tube 10 negatively by drawing current through the grid on the positive peaks in a well known manner, thus causing the condenser to charge up. This causes the grid of the vacuum tube, during the intervals 60 and 61, to be biased negatively to a value that would cut off the other succeeding, weaker signals 50 and 51 if no means to rapidly discharge the condenser 24 is provided.

In this circuit when the grid 12 is driven negatively, by the grid current drawn during the intervals 60 and 61, the transistor 30, being a constant current device, can be regulated to provide a high impedance in the grid circuit to minimize the effective load across the input circuit 20 and 21. However, as soon as the high input signal voltages 60 and 61 are terminated, the electrons stored by condenser 24 are drawn off through the transistor 30. Simultaneously, the impedance of the transistor decreases so that the electron charge stored by the condenser 24 is rapidly drawn off at a constant rate instead of tapering off at a diminishing rate, as is the case with an ordinary grid leak resistor. By this means the grid 12 is quickly restored to its correct operating bias so that the following signals 51, etc., can be almost immediately amplified. This function is repeated after each succeeding interval of high input signal voltage.

If a resistance large enough to maintain a particularly high D.-C. resistance across the input were used in place of the transistor in the ordinary way, it might take most of the interval 51 before the bias voltage on the grid lowered itself enough to amplify the lower voltage signals. In such case all or part of the signal 51A would be eliminated.

The type of transistor used can be chosen to provide the correct resistance for the circuit being used. The initial resistance that the transistor places in series with the radio frequency choke 40 can also be controlled by varying the voltage 38 applied as a bias to the emitter electrode 32. If the positive bias is increased the resistance will be decreased or, conversely, and as the bias is decreased the resistance of the transistor will be increased.

Other types of transistors and other configurations with the various biasing voltages changed accordingly may be used in place of the one shown in this circuit.

Typical values for the components of a circuit operating in the frequency range of 47 mc./s. to 55 mc./s. are as follows: The vacuum tube 10 is a type 5678, the transistor is of the PNP variety, the biasing voltage 38 is about .2 volt, the condensers 24 and 26 are between 50 and 100 micromicrofarads, and the inductance 18 is about .75 microhenry, and the voltage applied between terminal 17 and 21 is 44 volts. Under normal operations the grid 12 may be driven negatively 50 volts or more.

Although a vacuum tube 10 is shown as a typical place where this circuit can be used it will be obvious that this circuit may be used in other ways and with other devices such as transistors.

With the circuit herein the receiver may be left on constantly. It may be partially blocked when the transmitter is in use, with the side tones clearly audible, yet it still will be almost immediately resensitized when the transmitter is turned off.

Having described the invention, what is claimed is:

In combination with a vacuum tube having cathode, grid, and plate electrodes, a condenser connecting a low impedance source of input signals to said grid; a circuit for discharging said condenser comprising a transistor having an output circuit and a control circuit, a choke coil connected in series with said output circuit between said grid and cathode electrodes, and a source of bias connected across said control circuit having one terminal connected to said cathode, to provide a low impedance, constant current discharge path between said grid and cathode electrodes when said grid is driven negative with respect to its normal operating potential.

References Cited in the file of this patent

UNITED STATES PATENTS

| | | |
|---|---|---|
| 2,218,925 | Van B. Roberts | Oct. 22, 1940 |
| 2,583,345 | Schade | Jan. 22, 1952 |

FOREIGN PATENTS

| | | |
|---|---|---|
| 1,106,637 | France | July 20, 1955 |

OTHER REFERENCES

Germany, German printed application, I 10090 VIIIa/21a, October 11, 1956.